United States Patent
Greppmair

(10) Patent No.: US 6,327,923 B1
(45) Date of Patent: Dec. 11, 2001

(54) WORKING TOOL, IN PARTICULAR SOIL RAMMER OR HAMMER

(75) Inventor: Martin Greppmair, Munich (DE)

(73) Assignee: Wacker-Werke GmbH & Co. KG, Munich (DE)

( * ) Notice: Subject to any disclaimer, the term of this patent is extended or adjusted under 35 U.S.C. 154(b) by 0 days.

(21) Appl. No.: 09/402,846

(22) PCT Filed: Apr. 1, 1998

(86) PCT No.: PCT/EP98/01892

§ 371 Date: Oct. 8, 1999

§ 102(e) Date: Oct. 8, 1999

(87) PCT Pub. No.: WO98/45540

PCT Pub. Date: Oct. 15, 1998

(30) Foreign Application Priority Data

Apr. 9, 1997 (DE) .............................. 197 14 555

(51) Int. Cl.[7] .............................. E01C 19/32; F16F 15/62
(52) U.S. Cl. .......................... 74/22 R; 74/61; 404/133.05
(58) Field of Search .......................... 404/133.05, 133.1; 74/22 R, 22 A, 44, 61, 591

(56) References Cited

U.S. PATENT DOCUMENTS

| | | | | |
|---|---|---|---|---|
| 3,308,728 | * | 3/1967 | Brown | 404/133.1 |
| 3,416,418 | * | 12/1968 | Frohnauer, Jr. | 404/133.1 |
| 3,630,127 | * | 12/1971 | Yamato | 404/133.1 |
| 3,832,080 | * | 8/1974 | Stoecker | 74/61 X |
| 3,856,426 | * | 12/1974 | Waschulewski et al. | 404/133.1 |
| 3,899,262 | * | 8/1975 | Yamamoto | 404/133.1 |
| 3,997,278 | * | 12/1976 | Riedl | 404/133.1 |
| 4,014,620 | * | 3/1977 | Vural et al. | 404/133.1 |
| 4,104,001 | * | 8/1978 | Uebel | 404/133.1 |
| 4,321,837 | * | 3/1982 | Grigsby | 74/591 X |
| 4,389,137 | * | 6/1983 | Riedl | 74/61 X |
| 4,509,378 | * | 4/1985 | Brown | 74/603 X |
| 4,712,436 | * | 12/1987 | Brown | 74/603 X |
| 5,282,397 | * | 2/1994 | Harkness et al. | 74/603 |
| 6,000,879 | * | 12/1999 | Greppmair | 404/133.05 X |

FOREIGN PATENT DOCUMENTS

| | | |
|---|---|---|
| 1925870 | 11/1970 | (DE) . |
| 1.254.008 | 1/1961 | (FR) . |
| 2159236 A | 11/1985 | (GB) . |

* cited by examiner

Primary Examiner—David Fenstermacher
Assistant Examiner—Colby Hansen
(74) Attorney, Agent, or Firm—Boyle Fredrickson Newholm Stein & Gratz S.C.

(57) ABSTRACT

A working tool, in particular a soil rammer or hammer, has two masses that may be linearly moved back and forth with respect to one another, namely, a top mass which has a driving motor and a ramming or striking working mass which can be moved by the motor relative to the top mass by means of a crank drive and a set of springs. In order to reduce as much as possible the displacement of the top mass, an additional counterweight can be moved by the motor over at least a large part of the path of displacement of the working mass in the opposite direction thereto. The displacement of the end of the set of springs linked to the crank drive and the displacement of the counterweight are preferably offset relative to one another, with respect to the crank angle, by 180° minus a phase shift derived from the construction parameters of the set of springs.

15 Claims, 5 Drawing Sheets

WORKING TOOL, IN PARTICULAR SOIL RAMMER OR HAMMER

BACKGROUND OF THE INVENTION

1. Field of the Invention

The invention relates to a working appliance, in particular a tamper for soil compaction or a hammer, with a tamping or beating working mass driven linearly back and forth, via a crank mechanism and a spring assembly, by a motor belonging to the upper mass.

2. Description of the Related Art

Known tampers of this type are designed in such a way that the upper mass comprises approximately two thirds and the beating working mass or lower mass one third of the entire tamper mass, whilst the distances covered in each case by the upper mass and the working mass are in inverse ratio to one another. In this case, the movement of the upper mass is of the order of magnitude of 25 to 30 mm.

This movement of the upper mass at a frequency of 10–11 Hz has adverse effects, because these vibrations are transmitted to the body of the person controlling the working appliance via a control handle, in particular to the person's hand and arm.

Although this transmission of vibrations to the body can for the most part be damped by the skilful attachment of rubber elements, there are nevertheless also high loads on the mounted drive motor, regardless of its design.

This problem also arises when the working appliance is mounted on other appliances or vehicles which may be seriously damaged by the vibrations occurring.

The output of the tamping system depends largely on the upper mass, since too great a working mass or too high a speed of the working mass moves the upper mass excessively and aggravates the problems described above.

These harmful effects can be partly inhibited by increasing the upper mass, but in this case the overall weight of the tamper is increased and the power consumption of the drive motor consequently rises.

DE-A 1 925 870 discloses a tamping appliance, in which a tamping foot can be driven, via a double crank mechanism, by a motor belonging to an upper mass. The drive power is distributed via gearwheels to two intermeshing crank disks which, via associated connecting rods, in each case drive rods connected to the tamping foot. Centrifugal weights are fastened in each case to the oppositely rotating crank disks, in such a way that the horizontal components of the centrifugal forces cancel one another, whilst the vertical components are added together and counteract the vibration acting on the tamper housing due to the vibration of the tamping foot. The arrangement described has to have a bulky design due to the provision of two rods connecting the upper mass to the tamping foot and due to the meshing crank disks. The overall weight of the tamper is considerable.

OBJECTS AND SUMMARY OF THE INVENTION

The object on which the invention is based is, without any appreciable increase in the overall mass, to achieve substantial stabilization of the upper mass, whilst ensuring that the working appliance has a compact design.

In accordance with the invention, this object is achieved by providing a working appliance having a countermass that counteracts vibrations induced by operation of the working mass. The countermass, which can be driven in rotation by the motor that drives the working mass, includes first and second centrifugal weights that rotate in opposite directions to one another. The first centrifugal, weight which may be provided on the crank mechanism itself rotates about an axis of rotation that is coaxial with the crank mechanism. The second centrifugal weight rotates about an axis of rotation that is at least essentially coaxial to the axis of rotation of the crank mechanism. However, the axis of rotation of the second centrifugal weight may be offset in the direction of working mass reciprocation from the axis of rotation of the crank mechanism and the first centrifugal weight.

The working appliance is defined in that the second centrifugal weight is arranged rotatably about an axis of rotation arranged essentially coaxially to the axis of rotation of the crank mechanism. The first centrifugal weight is coaxial with or seated directly on the axis of rotation of the crank mechanism, and the second centrifugal weight is arranged behind the first centrifugal weight and has approximately the same flywheel moment as the first centrifugal weight. The second centrifugal weight is driven in the opposite direction to the first centrifugal weight about an axis of rotation that is offset somewhat relative to the axis of rotation of the crank mechanism and parallel to the direction of movement of the working mass.

In another embodiment of the invention the countermass can be moved linearly back and forth, parallel to the direction of movement of the working mass, with a phase shift unequal to 180° in relation to the movement of the working mass.

The upper mass is pressed upward by a crank mechanism at the moment when the crank mechanism presses the working mass and, therefore, the tamping foot downward via the connecting rod of said crank mechanism, a guide piston and a spring assembly. The result of the spring assembly is that, during the downward movement of the guide piston, the springs are first tensioned, so as to absorb energy, whereupon, with a delay caused thereby, they subsequently discharge the stored energy again for the downward load on the tamping foot. This delay must be taken into account when the movement of the countermass is to be coordinated as accurately as possible with the movement of the working mass. When the working mass is drawn upward again by the crank pin of the crank mechanism, the upper mass is moved downward.

In a further advantageous refinement, therefore, the movement of the spring assembly end connected to the crank mechanism and the movement of the countermass are offset relative to one another with respect to the crank angle by 180° minus a phase shift derived from the design parameters of the spring assembly.

By means of the crank mechanism, an oscillating movement of the upper mass relative to the working mass is built up, and only when the crank connected to the spring assembly goes past its vertex facing the spring assembly is the energy stored until then in the spring assembly released as tamping or beating energy, so that the countermovement of the countermass for damping the movement of the upper mass is required only at this moment, that is to say the movement of the countermass into its position furthest away from the working mass is to take place only when the crank connected to the spring assembly has passed through this vertex facing the spring assembly. This is achieved by means of the phase shift described above, which, in practice, must be coordinated at least approximately with the design parameters.

According to an expedient refinement, the countermass is guided on the upper mass in parallel with the direction of movement of the working mass. In this case, in an advantageous embodiment, the countermass is driven by a compensating eccentric on the crank mechanism, specifically, for example, via a connecting rod. According to another expedient refinement, the connection between the countermass and the compensating eccentric may be designed as a slider crank.

According to another expedient variant, the countermass consist of two part masses arranged in each case on one side of the crank mechanism and the other at approximately the same height with respect to the axis of rotation of the crank mechanism, and each part mass is driven by eccentric pin on an eccentric disk assigned to the part mass and rotatably coupled to the crank mechanism, the connection between the eccentric pin and the associated part mass being designed in each case as a slider crank.

In a further advantageous variant, the countermass consists of flyweights which are mounted on the upper mass rotatably about mutually parallel axes and are driven in rotation in opposite directions by the crank mechanism and the flywheel moment and mutual phase relationship of which are organized in such a way that they generate an oscillation directed in counteraction to the working mass, a further refinement being that the countermass consists of two centrifugal weights which are arranged symmetrically to the direction of movement of the working mass next to one another at about the same height in this direction and which are directly coupled to one another so as to be rotatable in opposite directions and are driven by the crank mechanism.

In another expedient embodiment for avoiding lateral forces, the countermass consists of a first centrifugal weight seated directly on the shaft of the crank mechanism and of two second centrifugal weights arranged symmetrically to the direction of movement of the working mass next to one another at about the same height in this direction and having flywheel moments equal to one another, such centrifugal weights being driven rotatably by the crank mechanism in the opposite direction to the first centrifugal weight and their flywheel moment in each case being about half the flywheel moment of the first centrifugal weight.

BRIEF DESCRIPTION OF THE DRAWINGS

The invention is explained in more detail by means of the following description of its exemplary embodiments illustrated in the drawing in which.

DESCRIPTION OF THE PREFERRED EMBODIMENTS

Figures 1, 2:
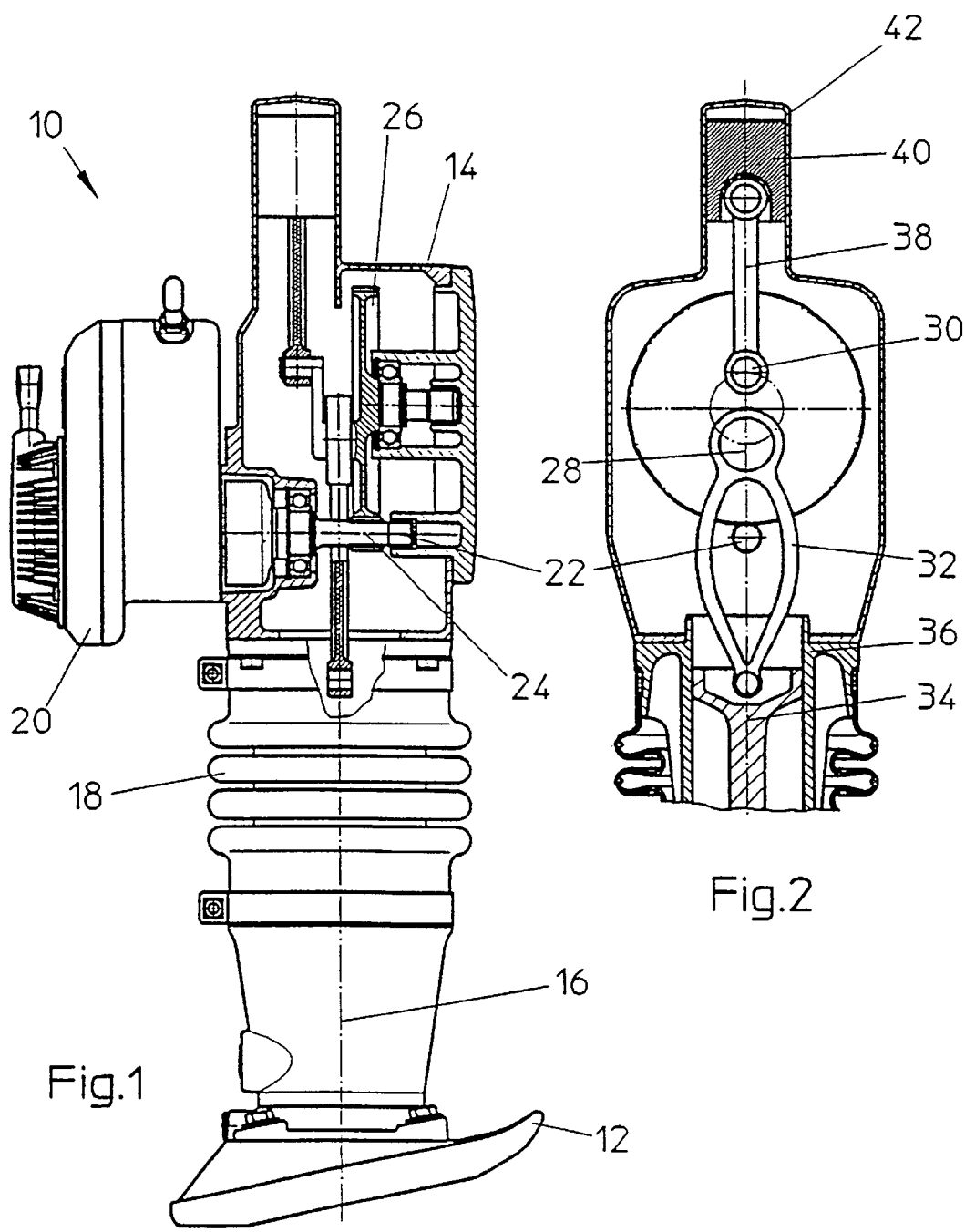
FIG. 1 shows a side view of a first embodiment of a tamper designed according to the invention, transversely to the crank axis, partly in a section taken in a plane containing the crank axis.
FIG. 2 shows a section of a detail through the housing of the crank mechanism of the embodiment shown in FIG. 1, in a plane at rightangles to the crank axis.

In the tamper shown in FIG. 1, and designated as a whole by 10, the control handle is not illustrated for the sake of clarity. The tamper 10 terminates at the bottom in a tamping foot 12 which can execute a back-and-forth movement in the direction of the movement axis 16 relative to the crank housing 14 shown in the upper region of the tamper 10, the outer cladding of the appliance therefore having a concertina-like portion 18 consisting of elastic material.

A drive motor 20 is fastened to one side of the crank housing 14, said drive motor driving a drive shaft 22 provided with a toothed pinion 24 which is in engagement with a circumferentially toothed crank disk 26. The crank disk 26 carries two crank pins 28 and 30 (FIG. 2) offset at approximately 180°. The crank pin 28 is connected, via a yoke-shaped connecting rod 32 surrounding the drive shaft 22, to a guide piston 34 which is arranged movably in the direction of the axis 16 in a piston guide 36 connected to the crank housing 14 and, being concealed in FIG. 1 by the concertina-like portion 18, is connected to the tamping foot 12 via a spring assembly. Connected via a connecting rod 38 to the crank pin 30 serving as a compensating eccentric is a piston 40 which is likewise arranged movably in the direction of the axis 16 in a piston guide 42 and, together with the connecting rod 38, forms the countermass, provided according to the invention, to the working mass.

An angular distance of 180° is shown in FIG. 2 between the crank pins 28 and 30. The piston or countermass 40 would consequently reach top dead center when the guide piston 34 connected to the spring assembly, not shown, reaches its bottom dead center. For the reasons already described, however, the piston 40 is to reach top dead center with a time delay, depending on the design features of the spring assembly, and therefore the angular distance must be selected smaller than 180° by the amount of a particular phase shift angle. In practice, this phase shift angle may be 70–100°.

Figure 3:
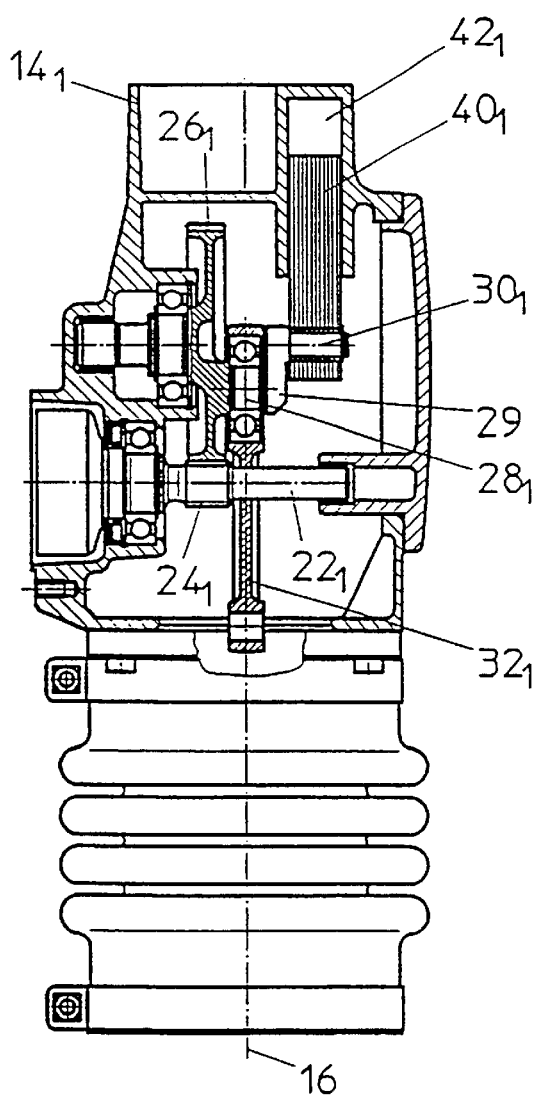
FIG. 3 shows a view, similar to that of FIG. 1, of the upper end of a tamper according to a second embodiment.
Figure 4:
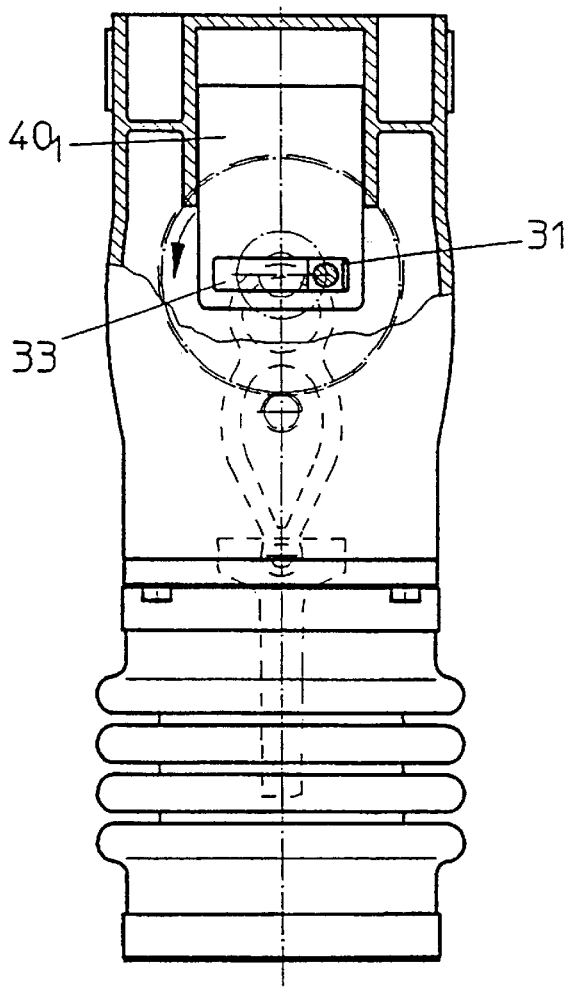
FIG. 4 shows a sectional view, similar to that of FIG. 2, of the second embodiment.

In the variant illustrated in FIGS. 3 and 4, the crank disk $26_1$, in engagement with the toothed pinion $24_1$, on the drive shaft $22_1$, is provided with a crank 29 bent so as to form the crank pins $28_1$ and $30_1$. The crank pin $28_1$, which forms the free end of the crank 29, engages into a sliding block 31 arranged dispaceably in a guide slot 33 formed in a piston $40_1$ serving as countermass. The piston $40_1$ is guided movably parallel to the axis of movement 16 in a guide $42_1$ formed on the crank housing $14_1$. The connecting rod $32_1$, configured for connection to the guide piston (not shown) and transmitting the movement to the spring assembly, is mounted on the crank pin $28_1$ The functioning of this variant corresponds largely to the design according to FIGS. 1 and 2. However, because the countermass is driven by a slider crank mechanism, this embodiment makes it possible to have a design which is shortened in the direction of the axis of movement 16.

Figure 5:
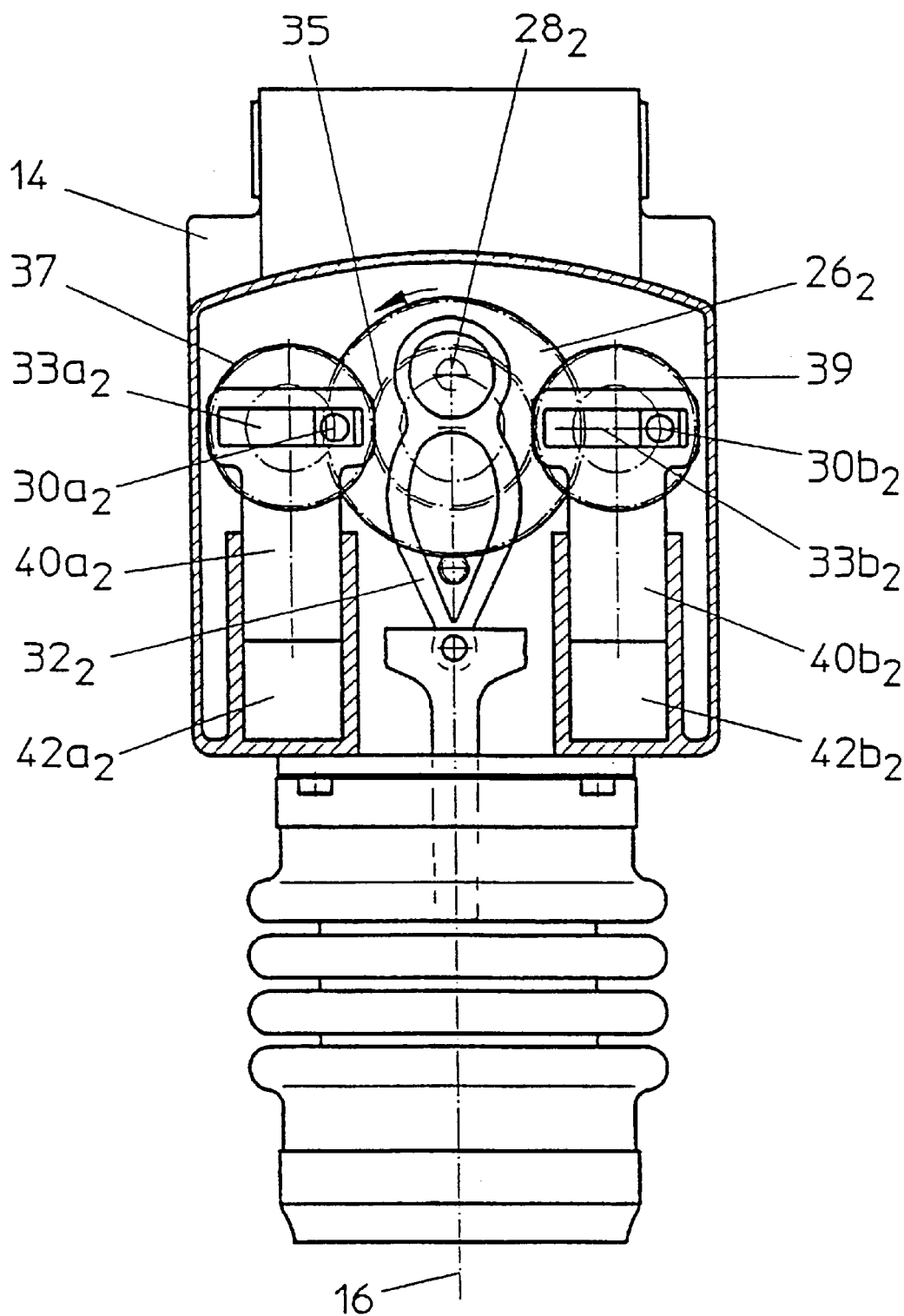
FIG. 5 shows a sectional view, similar to that of FIG. 4, in the case of a third embodiment.

FIG. 5 shows a variant which likewise provides a slider crank drive for the countermass, the arrangement making further shortening possible. The crank disk $26_2$, provided with the crank pin $28_2$ for the connecting rod $32_2$ for the transmission of movement to the spring assembly, is connected fixedly in terms of rotation to a gearwheel 35 which is arranged coaxially to the crank disk and with which two circumferentially toothed eccentric disks 37 and 39 are in engagement on both sides of the axis of movement 16 and are the same height with respect to the latter. The eccentric disks each carry an eccentric pin $30a_2$ and $30b_2$ which engage into guide slots $33a_2$ and $33b_2$, assigned to them, of two identically designed pistons $40a_2$ and $40b_2$ which together form the countermass, which are mounted displaceably parallel to the axis of movement in guides $42a_2$ and $42b_2$ assigned to the pistons and formed on the crank housing $14_2$.

The following variants replace the linearly movable countermass by rotating flyweights.

Figure 6:
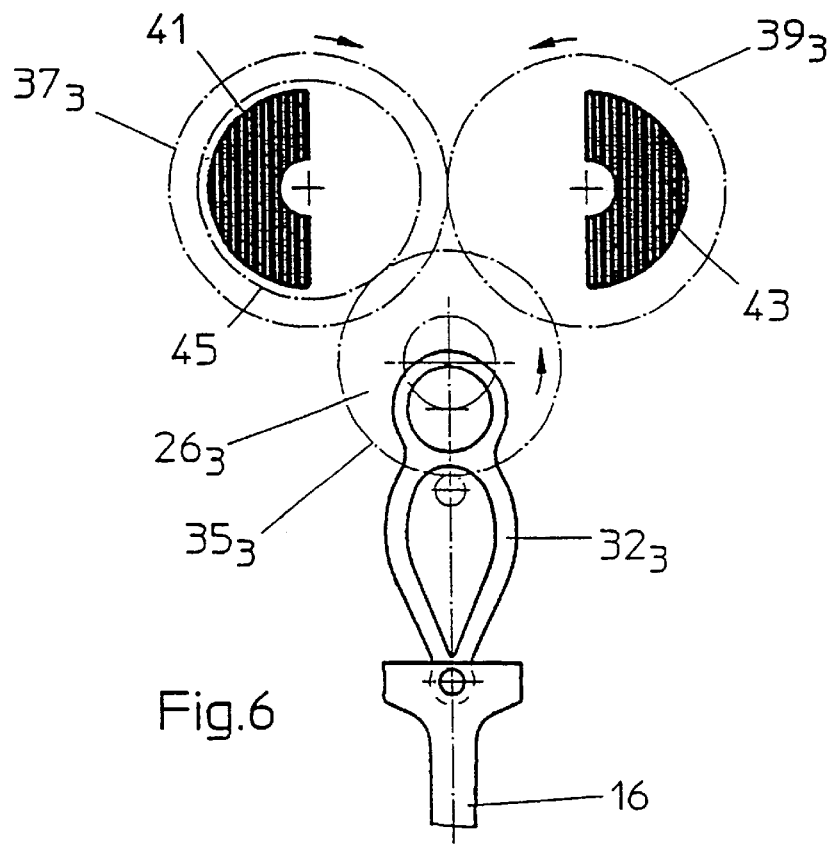
FIG. 6 shows a sectional view, similar to that of FIG. 4, in the case of a fourth embodiment.

In the variant according to FIG. 6, a gearwheel $35_3$ is connected fixedly in terms of rotation and coaxially to the crank disk $26_3$ for the purpose of actuating the connecting rod $32_3$. Two toothed disks $37_3$ and $39_3$ of the same size and the same number of teeth, which are in engagement with one another, are arranged on both sides of the axis of movement 16, at the same distance from the latter and at the same height with respect to this, said toothed disks in each case being provided with a centrifugal weight 41 and 43. The toothed disk $37_3$ is connected fixedly in terms of rotation and coaxially to a gearwheel 45 which is in engagement with the gearwheel $35_3$ having the same number of teeth, so that the two centrifugal weights 41 and 43 move in opposition to the movement of the connecting rod $32_3$ in a predetermined phase relationship. At the same time, the centrifugal weights 41 and 43 are arranged in such a way that their positions are in each case located opposite to one another mirror-symmetrically relative to the axis of movement 16. This avoids both lateral forces, such as are caused by the oblique connecting rod 38 in the embodiments according to FIGS. 1 and 2, and frictional losses in the guides 33, $33a_2$ and $33b_2$ according to FIGS. 3 to 5.

Figure 7:
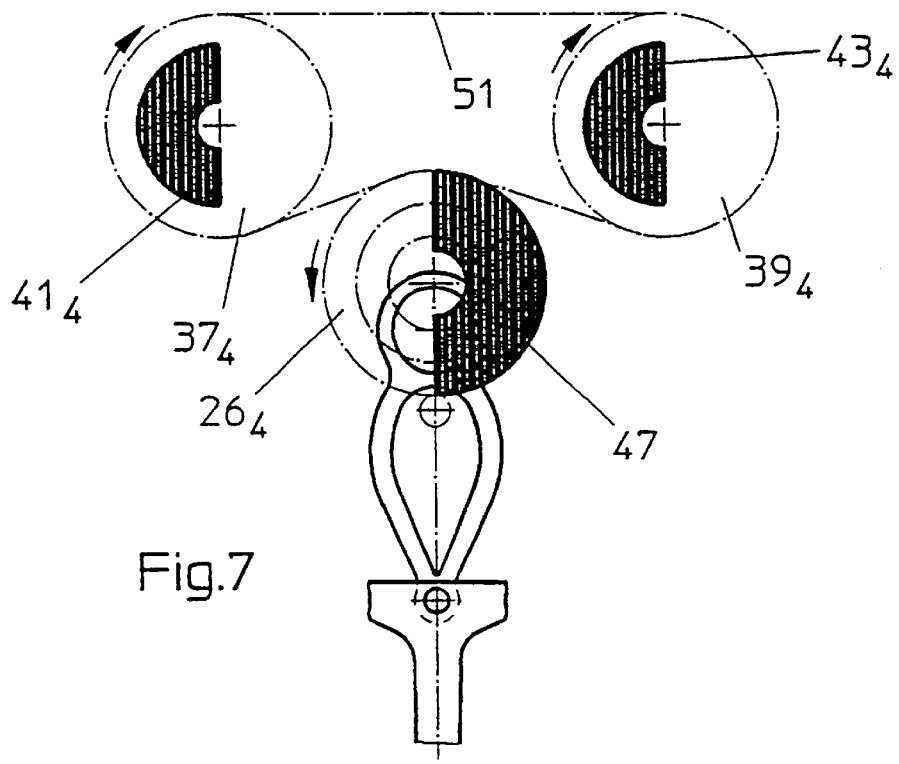
FIG. 7 shows a sectional view, similar to that of FIG. 4, in the case of a fifth embodiment.

The variant according to FIG. 7 shows a flyweight acting in only one direction and located on the crank mechanism and two flyweights which are opposed to said flyweight and which provide mass compensation and therefore also prevent any lateral movement. The flyweight on the crank mechanism is represented by the centrifugal weight 47 on the crank disk $26_4$. Two disks $37_4$ and $39_4$ identical in diameter to the crank disk $26_4$ and provided with centrifugal weights $41_4$ and $43_4$ are arranged symmetrically to the axis of movement. The three disks $26_4$, $37_4$ and $39_4$ are connected to one another for joint movement by means of a non-slip gear connection, for example a chain 51, in such a way that the two disks $37_4$ and $39_4$ move in the same direction of rotation, but in opposition to the crank disk $26_4$.

Figures 8, 9:
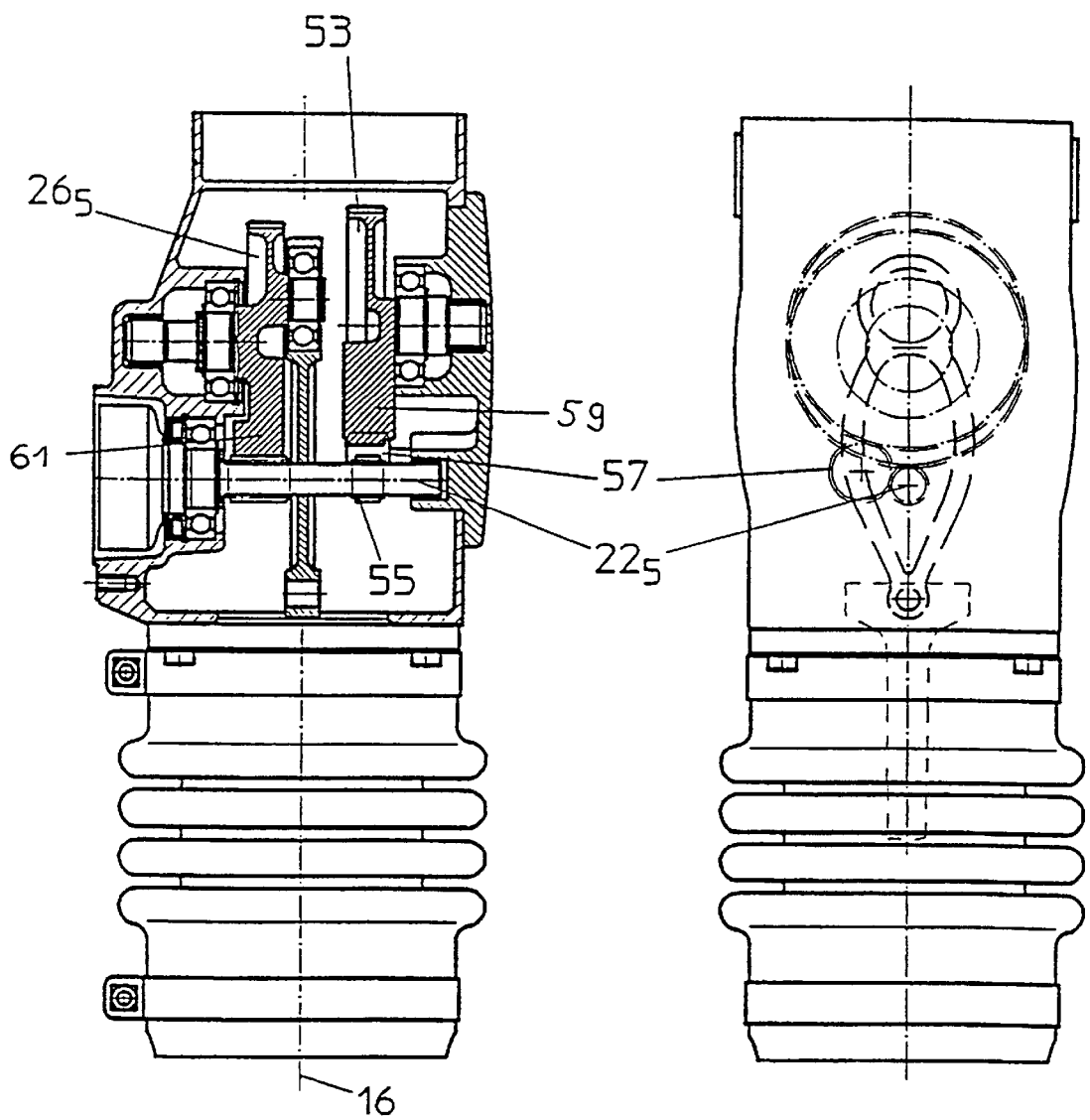
FIG. 8 shows a view, similar to that of FIG. 3, of the upper end of a tamper according to a sixth embodiment.
FIG. 9 shows a view, similar to that of FIG. 4, of the sixth embodiment.

FIGS. 8 and 9 show a final variant which is a development of the variant according to FIG. 7 in as much as the two disks $37_4$ and $39_4$ rotating in the same direction are replaced, in this case, by a single disk 53. The disk 53, which is offset relative to the crank disk $26_5$ in the direction of working mass reciprocation, is driven in opposition to the crank disk $26_5$ from the drive shaft $22_5$ via a specific pinion 55 and an intermediate wheel 57. A centrifugal weight 59 is provided on the disk 53 and, therefore, is arranged rotatably about an axis of rotation that is offset from the axis of rotation of the crank disk $26_5$. Another centrifugal weight 61 is mounted directly on the crank disk $26_5$ and, therefore, rotates about the axis of the crank disk $26_5$. Alternatively, disk 53 could be configured to rotate about an axis that is at least essentially coaxial with the axis of crank disk $26_5$.

What is claimed is:

1. A working appliance comprising:
    a working mass which can be driven to reciprocate linearly back and forth, via a crank mechanism, by a motor of an upper mass of the working appliance; and
    a countermass which can be driven in rotation by the motor and via which a force opposed to a force acting on the upper mass as a result of the movement of the working mass can be generated, the countermass having a first centrifugal weight rotatable about an axis of rotation that is coaxial with an axis of rotation of the crank mechanism and a second centrifugal weight rotatable in opposition to a direction of rotation of the first centrifugal weight;
    wherein the second centrifugal weight is arranged rotatably about an axis of rotation that is arranged at least essentially coaxially to the axis of rotation of the crank mechanism.

2. The working appliance as claimed in claim 1, wherein a flywheel moment of the first and second centrifugal weights and a mutual phase relationship of the first and second centrifugal weights are organized in such a way that the centrifugal weights generate an oscillation counteracting vibration caused as a result of the movement of the working mass.

3. The working appliance as claimed in claim 2, wherein the oscillation generated by the centrifugal weights is phase-shifted relative to the movement of the working mass by a value unequal to 180°.

4. The working appliance as claimed in claim 1, wherein the movement of the crank mechanism can be transmitted to the working mass via a connecting rod surrounding a drive shaft of the crank mechanism.

5. The working appliance as claimed in claim 4, wherein the connecting rod has a recess arranged in the line of the transmission of force of the connecting rod.

6. The working appliance as claimed in claim 4, wherein the first centrifugal weight and the second centrifugal weight are driven in rotation by the drive shaft.

7. A working appliance comprising:
    a working mass which can be driven to reciprocate linearly back and forth, via a crank mechanism, by a motor of an upper mass of the working appliance; and
    a countermass which can be driven in rotation by the motor and via which a force opposed to a force acting on the upper mass as a result of the movement of the working mass can be generated, the countermass having a first centrifugal weight rotatable about an axis of rotation coaxial with an axis of rotation of the crank mechanism and a second centrifugal weight rotatable in opposition to a direction of rotation of the first centrifugal weight;
    wherein the second centrifugal weight is rotatable about an axis of rotation that is offset relative to the axis of rotation of the crank mechanism in a direction parallel to a direction of working mass reciprocation.

8. The working appliance as claimed in claim 1, wherein the first centrifugal weight is provided directly on the crank mechanism.

9. A working appliance comprising:
    a motor;
    a crank mechanism;
    a working mass which can be driven to reciprocate linearly back and forth by the motor via the crank mechanism, wherein the motor comprises part of an upper mass of the working appliance; and
    a countermass which can be driven to rotate by the motor and via which a force opposed to a force acting on the upper mass as a result of the movement of the working mass can be generated, the countermass comprising a first centrifugal weight rotatable about an axis of rotation that is coaxial with an axis of rotation of the crank mechanism, and a second centrifugal weight rotatable in opposition to a direction of rotation of the first centrifugal weight, the second centrifugal weight being rotatable about an axis of rotation that is parallel to the axis of rotation of the crank mechanism.

10. The working appliance as claimed in claim 9, wherein a flywheel moment of the first and second centrifugal weights and a mutual phase relationship of the first and second centrifugal weights are organized in such a way that the centrifugal weights generate an oscillation counteracting the movement of the upper mass caused as a result of the movement of the working mass.

11. The working appliance as claimed in claim 10, wherein the oscillation generated by the centrifugal weights is phase-shifted relative to the movement of the working mass by a value unequal to 180°.

12. The working appliance as claimed in claim 9, further comprising a drive shaft for the crank mechanism and a connecting rod that surrounds the drive shaft and that couples the crank mechanism to the working mass.

13. The working appliance as claimed in claim 12, wherein the connecting rod has a recess arranged in a line of the transmission of force thereof.

14. The working appliance as claimed in claim 12, wherein the first centrifugal weight and the second centrifugal weight are driven to rotate by the drive shaft.

15. The working appliance as claimed in claim 9, wherein the first centrifugal weight is provided directly on the crank mechanism.

* * * * *